(12) United States Patent
Kim et al.

(10) Patent No.: US 8,256,009 B2
(45) Date of Patent: Aug. 28, 2012

(54) METHOD AND APPARATUS FOR MANAGING DIGITAL RIGHTS OF SECURE REMOVABLE MEDIA

(75) Inventors: Te-Hyun Kim, Seoul (KR); Seung-Jae Lee, Anyang-si (KR); Youn-Sung Chu, Uiwang-Si (KR)

(73) Assignee: LG Electronics Inc., Seoul (KR)

( * ) Notice: Subject to any disclaimer, the term of this patent is extended or adjusted under 35 U.S.C. 154(b) by 945 days.

(21) Appl. No.: 11/598,033

(22) Filed: Nov. 13, 2006

(65) Prior Publication Data
US 2007/0157318 A1 Jul. 5, 2007

(30) Foreign Application Priority Data
Nov. 11, 2005 (KR) .................. 10-2005-0108263

(51) Int. Cl.
*G06F 11/00* (2006.01)

(52) U.S. Cl. .............. 726/27; 726/5; 726/9; 726/18; 726/19; 726/26; 713/165; 713/189; 713/185; 713/193; 709/202; 709/219; 705/51

(58) Field of Classification Search .......... 726/1–6, 726/9, 22–30; 713/155–161
See application file for complete search history.

(56) References Cited

U.S. PATENT DOCUMENTS

| | | | | |
|---|---|---|---|---|
| 7,509,685 B2 * | 3/2009 | Lambert | ........................ | 726/27 |
| 7,634,807 B2 * | 12/2009 | Yan et al. | ........................ | 726/22 |
| 7,779,479 B2 * | 8/2010 | Lee et al. | ........................ | 726/27 |
| 7,792,517 B2 * | 9/2010 | Mowry et al. | ................. | 455/410 |
| 7,930,765 B2 * | 4/2011 | Schneider | ........................ | 726/31 |
| 7,937,750 B2 * | 5/2011 | Mahalal et al. | .................... | 726/9 |
| 2005/0021556 A1 * | 1/2005 | Noguchi et al. | .............. | 707/102 |
| 2005/0044391 A1 * | 2/2005 | Noguchi et al. | .............. | 713/193 |
| 2005/0172127 A1 * | 8/2005 | Hartung et al. | ............... | 713/167 |
| 2005/0209972 A1 * | 9/2005 | Bjorkengren et al. | .......... | 705/57 |
| 2005/0216739 A1 * | 9/2005 | Lee et al. | ....................... | 713/168 |
| 2005/0267845 A1 * | 12/2005 | Oh et al. | ......................... | 705/51 |
| 2005/0268097 A1 * | 12/2005 | Oh et al. | ....................... | 713/168 |
| 2005/0268346 A1 * | 12/2005 | Lee et al. | ........................ | 726/27 |

(Continued)

FOREIGN PATENT DOCUMENTS
EP 1526432 A2 4/2005
(Continued)

OTHER PUBLICATIONS

Rob Koenen, The long march to interoperable digital rights management, May 18, 2004, IEEE, vol. 92, Issue 6, pp. 3-11.*

(Continued)

*Primary Examiner* — Nathan Flynn
*Assistant Examiner* — Viral Lakhia
(74) *Attorney, Agent, or Firm* — Birch, Stewart, Kolasch and Birch, LLP

(57) ABSTRACT

Disclosed is a method and apparatus for managing rights object of SRM in a digital rights management system. The method for managing rights object bound to the SRM, comprises: transmitting ROAP trigger from a rights issuer to a terminal; transmitting an RO request message from the terminal to the rights issuer and transmitting a response message to the RO request message from the rights issuer to the terminal; and transmitting the rights object included in the response message from a DRM agent of the terminal to a DRM agent of the SRM and installing the rights object in the SRM. Accordingly, the SRM can receive its own rights object from the rights issuer through the terminal.

17 Claims, 5 Drawing Sheets

U.S. PATENT DOCUMENTS

| | | | |
|---|---|---|---|
| 2006/0010498 A1* | 1/2006 | Oh et al. | 726/26 |
| 2006/0031164 A1* | 2/2006 | Kim | 705/51 |
| 2006/0080740 A1* | 4/2006 | Bremer et al. | 726/26 |
| 2006/0206708 A1* | 9/2006 | Son et al. | 713/163 |
| 2007/0088660 A1* | 4/2007 | Abu-Amara | 705/57 |
| 2007/0112680 A1* | 5/2007 | van Niekerk et al. | 705/57 |
| 2007/0168293 A1* | 7/2007 | Medvinsky | 705/57 |
| 2007/0198430 A1* | 8/2007 | Takahashi et al. | 705/59 |
| 2008/0046758 A1* | 2/2008 | Cha et al. | 713/189 |
| 2008/0155646 A1* | 6/2008 | Lee | 726/1 |
| 2009/0254983 A1* | 10/2009 | Lee et al. | 726/9 |

FOREIGN PATENT DOCUMENTS

| | | | |
|---|---|---|---|
| GB | 2338381 A | 12/1999 | |
| JP | 2002-517869 A | 6/2002 | |
| JP | 2004-326210 A | 11/2004 | |
| JP | 2005-86547 A | 3/2005 | |
| JP | 2005-129058 A | 5/2005 | |
| WO | WO-2005/091162 A1 | 9/2005 | |
| WO | WO-2005/091551 A1 | 9/2005 | |
| WO | WO-2005/093558 A1 | 10/2005 | |
| WO | WO-2005/101258 A1 | 10/2005 | |

OTHER PUBLICATIONS

Dennis Hissink, ScanDisk TrustedFlash Introduction, "Lets Go Digital", http://www.letsgodigital.org, Sep. 27, 2005.

OMA DRM Specification, V2.0, Open Mobile Alliance, Apr. 2004, Draft Version 2.0, pp. 20, 22-23, 40-45, URL//http://xml.coverpages.org/OMADRMv204-20040420.

* cited by examiner

METHOD AND APPARATUS FOR MANAGING DIGITAL RIGHTS OF SECURE REMOVABLE MEDIA

TECHNICAL FIELD

The present invention relates to a digital rights management (DRM) system, and more particularly, to a method and system for issuing, downloading and storing digital rights of DRM digital contents in a secure removable media (SRM).

BACKGROUND ART

Generally, DRM is a technology for securely protecting and systemically managing rights object of digital contents, and provides a series of protection and management systems relating to illegal copy of digital contents, acquisition of rights to use the digital contents, and procedures of use of the digital contents.

FIG. 1 illustrates a general DRM system.

The general DRM system controls digital contents provided from a contents provider to a user to allow the user to use the digital contents as much as rights object (RO) granted to the user. At this time, the contents provider is an entity corresponding to a contents issuer (CI) and/or a rights issuer (RI).

The contents issuer issues contents (hereinafter, referred to as "DRM contents" (or digital contents)) protected using a specific encoding key to protect the DRM contents from users having no right to access them, and issues rights object required to use the DRM contents.

A DRM agent provided in a terminal receives the DRM contents and rights object from the contents issuer and the rights issuer, and controls use of the DRM contents in a corresponding terminal by analyzing permission and/or constraint included in the rights object.

Generally, since the rights object is encoded by a public key of a specific terminal, terminals other than a terminal having a private key corresponding to the public key cannot decode and use the DRM contents related to the rights object.

For this reason, a problem occurs in that terminals other than a specific terminal to which the rights object has been issued cannot read out the DRM contents from the memory card (that is, SRM can be called) if the rights object and the DRM contents related to the rights object are stored in a portable memory card (SRM) such as a multimedia card in the general DRM system.

Also, since the rights object has issued to the specific terminal in the general DRM system, if the rights object and the DRM contents related to the rights object are stored in the memory card, only the specific terminal to which the rights object has been issued can read out the DRM contents and the rights object from the SRM. For this reason, a problem occurs in that utility of the SRM is deteriorated.

Moreover, a problem occurs in that the SRM cannot have its own rights object because the contents provider cannot issue the rights object of the DRM contents to the SRM in the general DRM system.

DISCLOSURE OF THE INVENTION

Therefore, an object of the present invention is to provide a method and apparatus for managing digital rights of a memory card, in which the memory card can have its own rights object.

Another object of the present invention is to provide a method and apparatus for issuing, downloading and storing rights object of DRM contents in a memory card.

Other object of the present invention is to provide a method and apparatus for managing rights object of SRM, in which a terminal connected to the SRM obtains the rights object bound to the SRM and transmits the rights object to the SRM.

To achieve these and other advantages and in accordance with the purpose of the present invention, as embodied and broadly described herein, there is provided a rights object management system of secure removable media (SRM), which comprises a terminal receiving rights object bound to the SRM from a server; and the SRM receiving the rights object through the terminal.

In another aspect of the present invention, a method for managing rights object of SRM, the method comprises: requesting, by a device, a rights issuer of the rights object bound to the SRM; receiving, by the device, the rights object bound to the SRM from the rights issuer; and transmitting, by the device, the rights object bound to the SRM to the SRM.

In another aspect of the present invention, there is provided a method for managing rights object of SRM, the method comprises: transmitting, by a rights issuer, to a terminal a trigger for notifying that the terminal can be issued the rights object bound to the SRM from the rights issuer; receiving, by the rights issuer, a request of the rights object bound to the SRM through the terminal; and issuing, by the rights issuer, the rights object bound to the SRM to the SRM through the terminal.

In another aspect of the present invention, there is provided a terminal for managing digital rights of SRM, the terminal comprises: a DRM agent receiving rights object bound to the SRM.

The DRM agent transmits the received rights object to the SRM.

In another aspect of the present invention, there is provided an SRM for managing digital rights, the SRM comprises: a DRM agent receiving rights object bound to the SRM from a rights issuer through a terminal connected thereto.

In another aspect of the present invention, there is provided a rights object managing method for an SRM, the method comprising: transmitting an RO request message to request the rights object bound to the SRM from a terminal to a rights issuer; receiving a response message from the rights issuer to the terminal; transmitting the rights object included in the response message from the terminal to the SRM by allowing the terminal to verify the rights object; and verifying, by the SRM, the transmitted rights object and installing the rights object.

In another aspect of the present invention, there is provided a method for managing rights object of a memory card, which comprises allowing a terminal to verify rights object included in a response message of the rights object received from a server in conjunction with the memory card; and allowing the terminal to convert the rights object into a specific format that can be analyzed by the memory card and to transmit the specific format to the memory card.

In another aspect of the present invention, there is provided a method for managing rights object of a memory card, which comprises allowing a terminal to verify rights object included in a response message of the rights object received from a server in conjunction with the memory card; and allowing the terminal to notify failure in installation of the rights object if verification of the rights object is failed.

In another aspect of the present invention, there is provided a method for managing a rights object bound to an SRM, comprising: transmitting ROAP trigger from a rights issuer to a host device; transmitting an RO request message from the host device to the rights issuer and receiving a response message to the request message from the rights issuer to the host device; and transmitting the rights object included in the response message from a DRM agent of the host device to a DRM agent of the SRM and installing the rights object therein.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODES FOR CARRYING OUT THE PREFERRED EMBODIMENTS

Reference will now be made in detail to the preferred embodiments of the present invention, examples of which are illustrated in the accompanying drawings.

In the present invention, rights object (RO) bound to the memory card is issued through a terminal connected to the memory card. The terminal receives RO acquisition trigger (ROAP trigger) which indicates to the terminal that the rights object (RO) bound to the memory card is prepared in a contents provider, i.e., a rights issuer (RI) and that the rights object bound to the memory card is installed at the memory card. And the terminal generates an RO request message comprising at least a device ID of the memory card and its digital signature value, and transmits the generated RO request message to the rights issuer (RI). The rights issuer transmits a response message (RO response) including at least the rights object bound to the memory card and the device ID of the memory card included in the RO request message. The terminal transmits the rights object included in the response message to the memory card, and the memory card verifies and installs the rights object.

The ROAP trigger includes device ID of the memory card. The RO request message includes the device ID of the memory card, the digital signature value of the memory card, and a certificate chain of the memory card. The response message includes the device ID of the memory card and the rights object bound to the memory card.

Hereinafter, the preferred embodiment of the present invention will be described with reference to the accompanying drawings.

Figure 1:
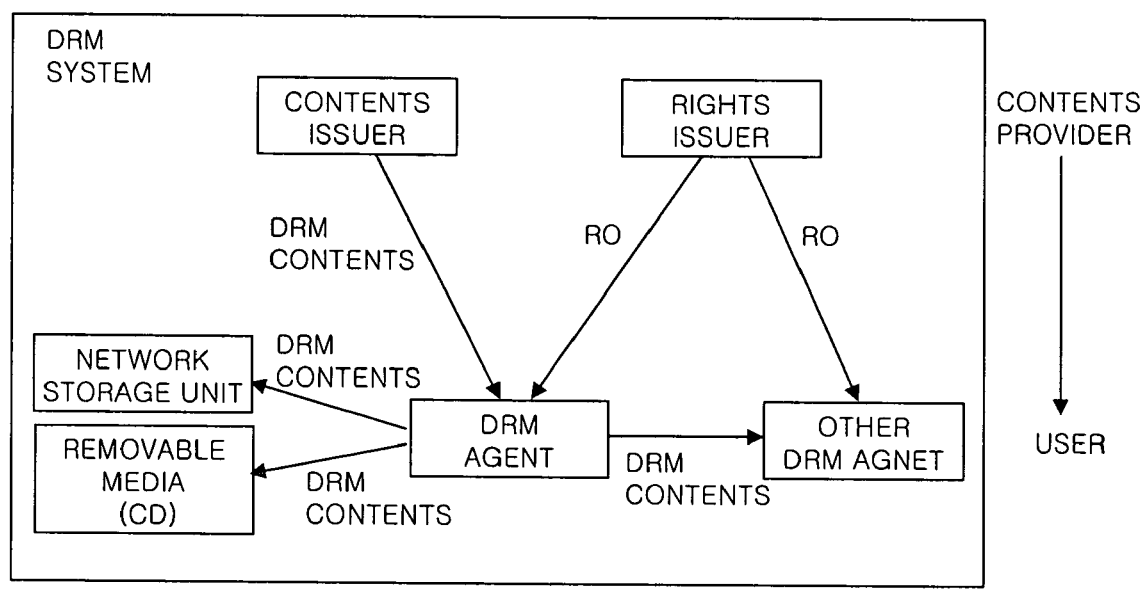
FIG. 1 illustrates a general DRM system.
Figure 2:
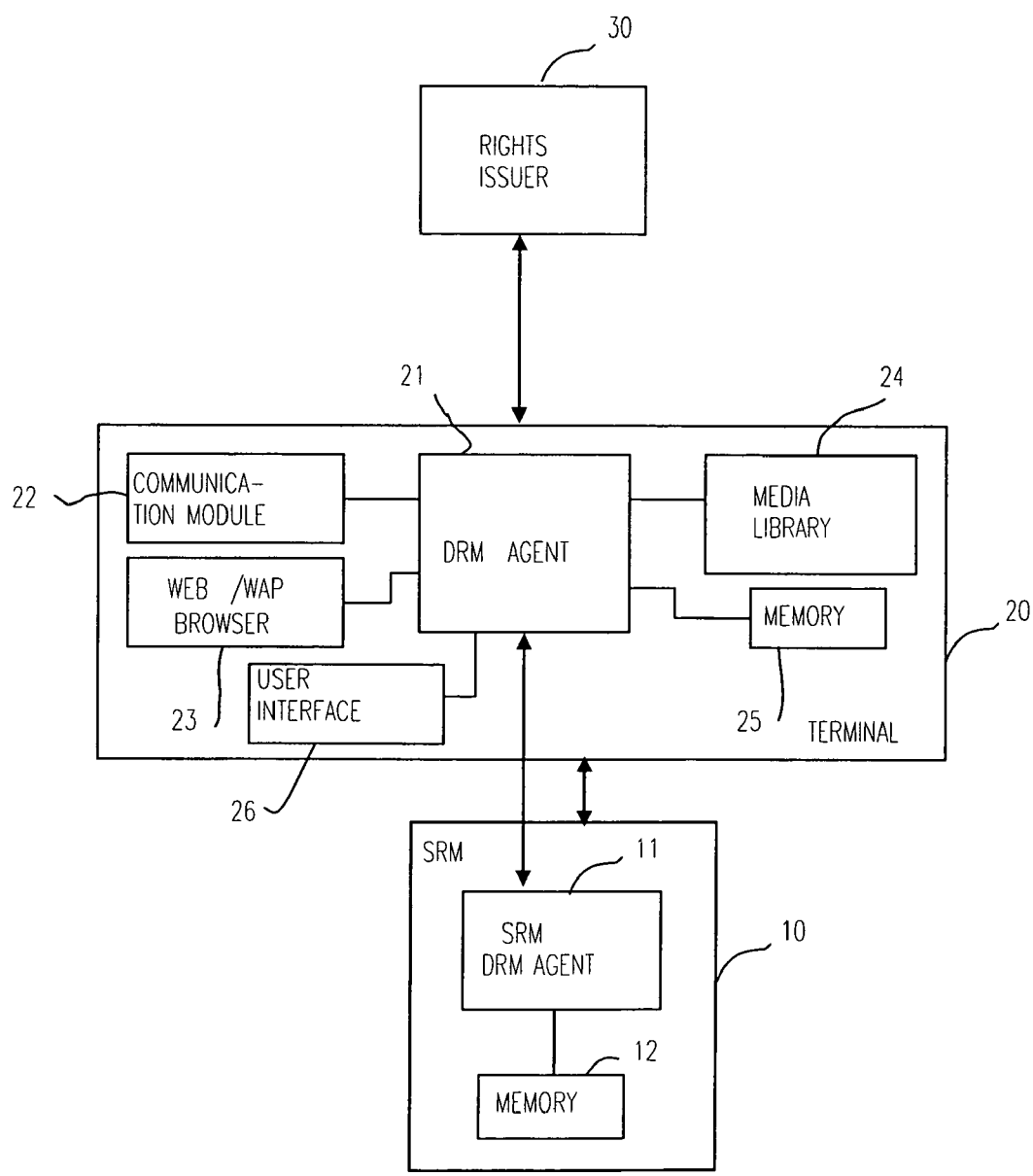
FIG. 2 illustrates a digital rights management system of SRM according to the present invention.

FIG. 2 illustrates a rights object management system of the memory card according to the present invention.

As shown in FIG. 2, the digital rights management system of the memory card according to the present invention includes a terminal 20 receiving rights object using by ID of the memory card and transmitting the rights object to the memory card 10, and the memory card 10 receiving the rights object using the ID of the memory card 10 through the terminal 20.

The digital rights management system further includes a contents provider that issues DRM contents and/or rights object bound to the memory card in accordance with a request of the terminal 20. The contents provider includes a rights issuer (RI) 30 which issues rights object of digital contents.

The terminal 20 includes a DRM agent 21 generating and transmitting an RO request message to request the rights object bound to the memory card, and transmitting the rights object bound to the memory card, which has been issued from the rights issuer 30 to the memory card 10.

The memory card 10 is referred to as secure removable media (SRM). The SRM 10 comprises a DRM agent 11 that performs mutual authentication with the terminal 20, and transmits the digital signature value of the SRM to the terminal 20 in accordance with the request of the terminal 20, and receives the DRM contents and/or rights object bound to the SRM through the terminal 20.

The terminal 20 further includes a communication module 22 communicating with the rights issuer 30, a web/WAP browser 23 accessing the rights issuer 30 under the control of the DRM agent 21 to receive the DRM contents and/or the rights object, and a user interface 26 interfacing with a user under the control of the DRM agent 21.

The terminal 20 further includes a media library 24 storing meta data of the DRM contents and/or meta data of the rights object, and a memory 25 storing the DRM contents and an application program and data of the DRM agent 21.

The contents provider may include a contents issuer issuing the DRM contents and/or a rights issuer 30 issuing the rights object bound to the SRM.

The SRM 10 may be a portable memory card that includes a processor and a memory to execute simple computation (or processing).

The SRM 10 further includes a memory 12 storing SRM DRM agent information including the DRM contents and/or the rights object received through the terminal 20.

The SRM DRM agent information includes DRM contents, meta data of the DRM contents, rights object of the DRM contents, meta data of the rights object, RI context of the rights issuer, and domain context of a domain for receiving the rights object.

The SRM agent 11 transmits the SRM signature value to be included in the RO request message requesting the rights object bound to the SRM to the DRM agent 21 of the terminal 20, and verifies the rights object transmitted through the DRM agent 21. The SRM agent 11 may set a security link with the terminal 20. The security link indicates a secure communication channel.

The SRM 10 includes a secure digital (SD) card, a multimedia card (MMC), a smart media card (SMC), a subscriber identification module (SIM) card, and various memory cards that can store multimedia.

The user interface 26 includes at least one of a keypad, a jog shuttle, a switch, a function key, a soft key, and menu.

The operation of the aforementioned digital rights management system of the SRM according to the present invention will be described with reference to the accompanying drawings.

Since the SRM 10 has no communication module, it intends to receive rights object of the DRM contents through the terminal 20.

Figure 3:
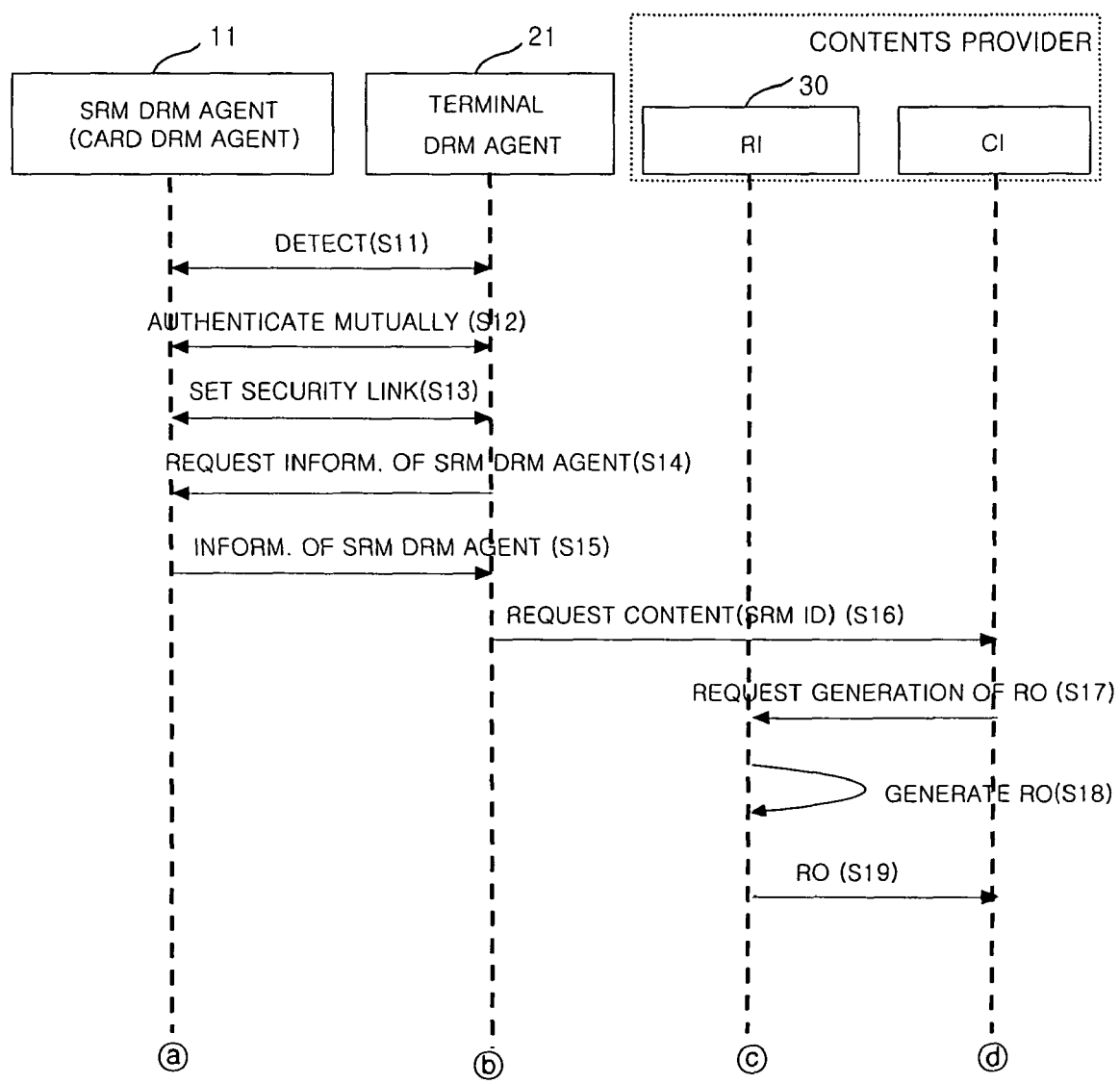
FIGS. 3 and 4 illustrate a method for managing digital rights of SRM according to the present invention.
Figure 4:
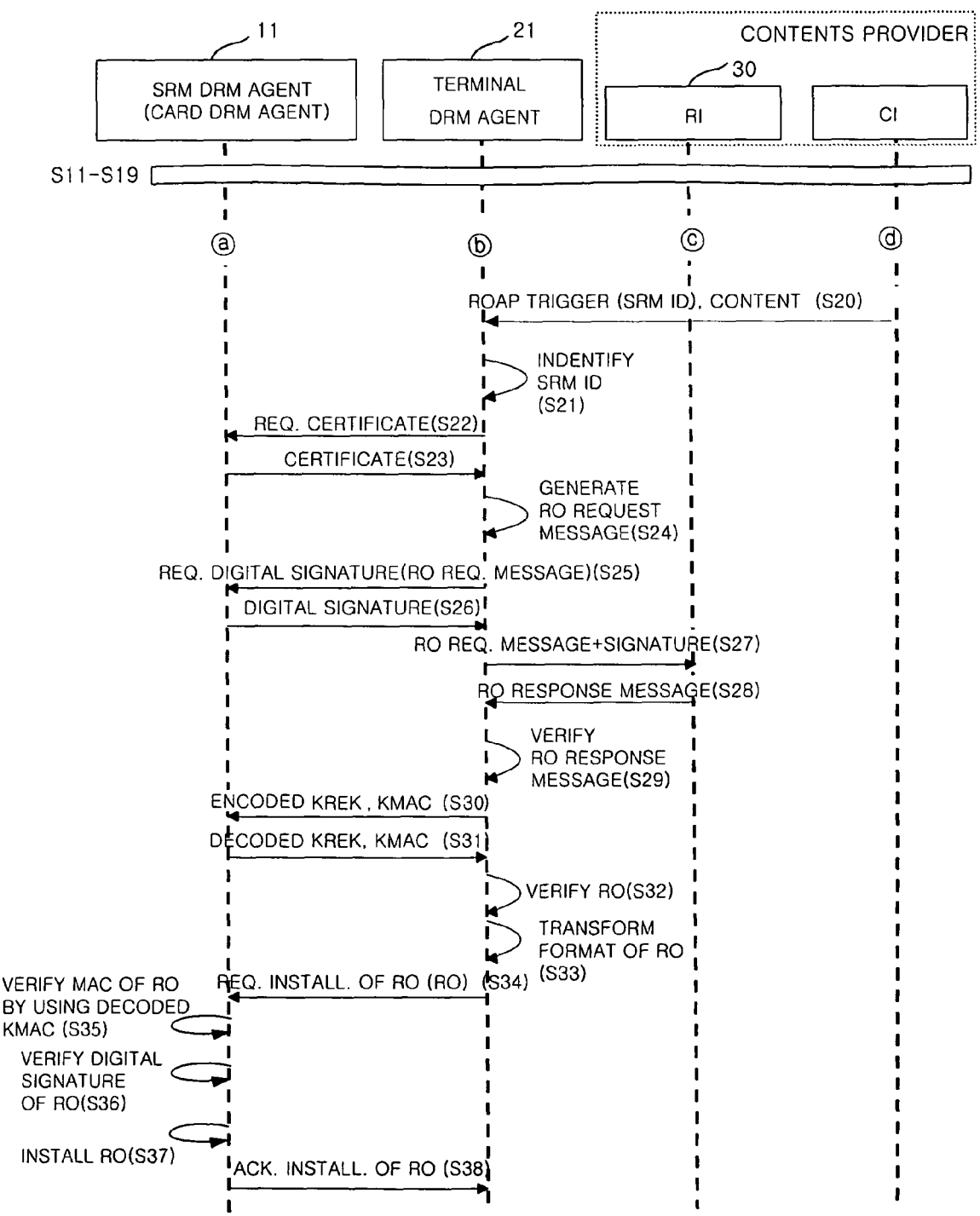

FIGS. 3 and 4 illustrate a method for managing digital rights of the SRM according to the present invention.

First, the first embodiment of the method for managing digital rights of the SRM according to the present invention will be described.

If a power source is applied after the SRM 10 is inserted into the terminal 20, the terminal 20 recognizes the SRM 10 (S11), and performs mutual authentication with the DRM agent 11 of the SRM (S12) (hereinafter, the DRM agent 11 of the SRM 10 can mean the SRM DRM agent 11). At this time, the terminal DRM agent 21 and the SRM DRM agent 11 mutually identify terminal ID (device ID of the terminal 10) and SRM ID (device ID of the SRM 10).

If mutual authentication is successfully completed, the terminal DRM agent 21 and the SRM DRM agent 11 set a secure communication channel. At this time, the secure communication channel between the terminal DRM agent 21 and the SRM DRM agent 11 is selectively set (S13).

The terminal DRM agent 21 requests the SRM DRM agent 11 of DRM agent information of SRM 11 (hereinafter, "DRM agent information of SRM can mean "SRM DRM agent information") (S14). The SRM DRM agent 11 provides the requested SRM DRM agent information to the terminal DRM agent 21 (S15). These steps S14 and S15 can be performed in the secure communication channel. The SRM DRM agent information is stored in the memory 12 of the SRM 10. The SRM DRM agent information includes DRM contents, meta data of the DRM contents, rights object of the DRM contents, meta data of the rights object, RI context of the rights issuer, and domain context of a domain for receiving the rights object.

If the SRM DRM agent information is provided by the SRM 10, the terminal 20 identifies the DRM contents and the rights object, which are to be issued, based on the SRM DRM agent information and the information stored in the media library 24.

If the specific DRM contents are already stored in at least one of the SRM 10 and the terminal 20, the terminal 20 may not download the specific DRM contents. The terminal 20 may transmit a contents purchase request to a contents issuer (CI) of the contents provider to receive rights object for reproducing the specific DRM contents.

If the specific DRM contents are stored in neither the SRM 10 nor the terminal 20, the terminal 20 may transmit the contents purchase request to the contents issuer (CI) of the contents provider to request the DRM contents and the rights object for reproducing the DRM contents.

The terminal 20 accesses a predetermined domain of the contents issuer through the web/WAP browser 23 to request the specific DRM contents (S16). In case of the request of the specific DRM contents, the terminal 20 may transmit a device parameter to the contents issuer. The device parameter indicates an identifier of the device which the rights object belongs to. For instance, the rights object belongs to the SRM, the device parameter indicates the SRM ID.

The contents issuer which has received the purchase request of the specific DRM contents requests the rights issuer 30 to generate the rights object of the specific DRM contents (S17). At this time, the contents issuer transmits the device parameter transmitted from the terminal 20 to the rights issuer 30. Also, the contents issuer may transmit meta data of ID of the DRM contents to the rights issuer 30.

Then, the rights issuer 30 generates the rights object of the DRM contents based on the device parameter (S18). If the device parameter represents a device ID of the SRM 10, the rights issuer 30 generates the rights object bound to the SRM 10.

The rights issuer 30 transmits to the contents issuer an RO generation confirmation message comprising the device parameter to notify that the rights object for the SRM 10 has been generated (S19).

The contents issuer transmits an RO download trigger, i.e., the RO acquisition trigger (ROAP trigger) to the terminal 20 to notify the terminal 20 to receive the rights object of the DRM contents (S20). The ROAP trigger comprises the device parameter (i.e., SRM ID) and information of the rights issuer 30. Also, the contents issuer may transmit the ROAP trigger to the terminal 20 along with the DRM contents. The DRM contents may be stored in the terminal 20 or the SRM 10. The terminal 20 provides a interface (for example, graphic user interface (GUI)) to allow the user to determine a memory area of the downloaded specific DRM contents.

The steps S16 to S19 may not be performed.

Meanwhile, after the steps S11 to S15 are performed, the terminal 20 can receive the ROAP trigger from the rights issuer 30 to receive the rights object (S20).

The terminal 20 which has received the ROAP trigger from the rights issuer 30 identifies the device parameter (SRM ID) included in the ROAP trigger (S21).

If the device parameter represents SRM ID, the terminal 20 requests the SRM agent 11 of the SRM 10 to provide the certificate chain (S22) and receives the certificate chain (S23). The received SRM certificate chain includes a public key of the SRM 10. If the terminal 20 is not in contact with the SRM 10, the terminal 20 immediately stops receiving procedure of the rights object bound to the SRM 10 (that is, ROAP transaction).

The terminal 20 generates a RO request message comprising the SRM certificate chain received in the step S23, by using SRM ID, to request the rights object bound to the SRM (S24).

If the RO request message for requesting the rights object bound to the SRM 10 is generated, the terminal 20 transmits the RO request message to the DRM agent 11 of the SRM 10 and requests the DRM agent 11 of the digital signature (S25).

The DRM agent 11 of the SRM 10 generates the digital signature using its private key and then transmits the generated digital signature to the DRM agent 21 of the terminal 20 (S26).

The DRM agent 21 of the terminal 20 transmits the RO request message comprising the SRM digital signature received from the DRM agent 11, to the rights issuer 30 (S27).

The rights issuer 30 transmits the rights object response message (RO response) including SRM ID and the rights object, to the terminal 20 (S28). In case of combined delivery of the digital contents and the rights object, the contents with the rights object can be transmitted to the terminal 20 when the rights object is transmitted to the terminal 20.

The DRM agent 21 of the terminal 20 analyzes the response message and verifies the digital signature of the response message (S29).

In this way, if verification of the message is successfully completed, the DRM agent 21 of the terminal 20 registers meta data of the rights object, which is included in the response message of the rights object, in the media library 24. If the contents are transmitted along with the rights object, the terminal also registers meta data of the contents in the media library 24. The contents may be stored in the terminal 20 if desired by the user.

The terminal 20 can convert the rights object transmitted from the rights issuer 30 into a format, which can be analyzed by the DRM agent 11 of the SRM 10, if necessary (S33). The terminal 20 transmits the rights object to the DRM agent 11 of the SRM 10 to instruct installation of the rights object (S34).

At this time, the contents may be transmitted to the SRM 10 along with the rights object. The DRM agent 11 of the SRM 10 may notify the terminal DRM agent 21 of the installation result of the rights object (S38).

Next, the second embodiment of the method for managing digital rights of the SRM according to the present invention will be described.

The second embodiment is executed in such a manner that steps S30 to S32 and S35 to S36 shown in FIG. 4 are added to the first embodiment.

Since the steps S11 to S29 of the second embodiment are the same as those of the first embodiment, steps S30 to S36 will be described below.

If the DRM agent 21 of the terminal 20 receives the response message to the RO request message from the rights issuer (RI) 30, the DRM agent 21 verifies the rights object included in the response message by interworking with the DRM agent 11 of the SRM 10. That is, the DRM agent 21 of the terminal 20 requests the DRM agent 11 of the SRM 10 to provide RO verification information for verification of the rights object included in the response message. In other words, the DRM agent 21 of the terminal 20 requests decoding of encoded (or encrypted) KREK (rights encryption key) or encoded (or encrypted) KMAC (key used in MAC algorithm for verifying integrity of rights object) (S30).

The DRM agent 11 of the SRM 10 decodes KREK or KMAC using its private key or domain key, and transmits the decoded (or decrypted) KREK or KMAC to the DRM agent 21 of the terminal 20 (S31).

The DRM agent 21 of the terminal 20 verifies a MAC value of the rights object included in the response message by using the transmitted KREK or KMAC (S32).

If verification of the message is successfully completed, the DRM agent 21 of the terminal 20 registers meta data of the rights object included in the response message in the media library 24. If contents are transmitted along with the rights object, the terminal 20 registers meta data of the contents in the media library 24. The terminal 20 may store the contents therein if desired by the user.

The terminal 20 may convert the rights object transmitted from the rights issuer 30 into a format that can be analyzed by the DRM agent 11 of the SRM 10 if necessary (S33). The terminal 20 requests installation after transmitting the Rights Object to the DRM agent of SRM (S34).

The DRM agent 11 of the SRM 10 verifies the MAC value of the rights object transmitted from the DRM agent 21, by using the KMAC decoded using its private key or domain key (S35). As a result, if the MAC value is valid, the DRM agent 11 of the SRM 10 installs the transmitted rights object (S37). If the MAC value is not valid, the DRM agent 11 of the SRM 10 doesn't install the transmitted rights object and discards the transmitted rights object.

Meanwhile, if the verified MAC value is valid in the step (S35), the DRM agent 11 can verify the digital signature value included in the transmitted rights object (S36). If the digital signature value is valid, the DRM agent 11 of the SRM 10 installs the transmitted rights object (S37).

The DRM agent 11 of the SRM 10 does not install the transmitted rights object and discards the transmitted rights object, if the MAC value or the digital signature value is not valid.

After installing the rights object, the SRM 10 may transmit a confirmation message relating to installation of the rights object to the terminal 20 (S38).

Now, a method for acquiring digital rights of the SRM according to the third embodiment of the present invention will be described.

First, the user connects to the rights issuer, and then the rights issuer transmits ROAP trigger to indicate that the rights object should be installed in the SRM, to the DRM agent of the terminal.

The DRM agent of the terminal requests the DRM agent of the SRM of a certificate and receives the certificate from the DRM agent of the SRM.

The DRM agent of the terminal generates a request message (RO Request message) including the certificate of the SRM and obtains a digital signature value for the generated RO Request message through the DRM agent of the SRM (wherein, the DRM agent of the SRM calculates the digital signature value using its private key and transmits the digital signature value to the terminal). The terminal attaches the digital signature value obtained from the DRM agent of the SRM to the original RO Request message, and then sends the RO Request message to the rights issuer. At this time, the RO Request message includes at least SRM ID, SRM certificate chain, and SRM information. The SRM certificate chain represents that the terminal is connected with the SRM. If the terminal is not connected with the SRM, the terminal immediately aborts further procedure for receiving the rights object bound to the SRM.

The rights issuer sends RO Response message (response message), which includes the RO encoded (or encrypted) by the public key of the SRM, SRM ID and the digital signature value, to the terminal. The digital signature value is equal to the digital signature value received through the RO request message. Later steps for performing the response message are the same as the steps S29 to S38 shown in FIG. 4.

Next, the method for acquiring rights object of the SRM according to another embodiment of the present invention will be described on the basis of a success case and a failure case.

When transmitting the RO request message and thus receiving the RO response message from the rights issuer (rights issuing server), the DRM agent of the terminal requests a certificate of the SRM and receives it. The DRM agent of the terminal undergoes verification of the rights object (RO) included in the RO response message in conjunction with the DRM agent of the SRM. In other words, for verification of the RO included in the RO response message, the DRM agent of the terminal requests the DRM agent of the SRM to decode KREK and KMAC.

The DRM agent of the SRM decodes KMAC and KREK using the private key of the SRM and transmits the decoded KMAC to the DRM agent of the terminal.

The DRM agent of the terminal identifies integrity of the RO using the received KMAC.

The DRM agent of the terminal transmits a pair of encoded CEK and content ID included in the RO to the DRM agent of the SRM along with RO ID and requests the DRM agent of the SRM to decode the CEK.

The DRM agent of the SRM decodes the encoded CEK transmitted from the DRM agent of the terminal by using the decoded KREK, stores each CEK by binding to content ID, and transmits to the DRM agent of the terminal whether CEK has been successfully decoded.

If the CEK has been successfully decoded, the DRM agent of the SRM notifies the DRM agent of the terminal that the CEK has been successfully decoded. Afterwards, the DRM agent of the SRM searches for CEK by using RO ID and content ID in accordance with a request from the DRM agent of the terminal and transmits the CEK to the DRM agent of the terminal. The DRM agent of the terminal converts the RO into a format (for example, secure removable media format for rights object (SRMF)) that can be recognized by the SRM and transmits the RO to the DRM agent of the SRM to instruct installation of the RO. The DRM agent of the SRM transmits to the DRM agent of the terminal whether the RO has been successfully installed.

However, if decoding of the encoded CEK has failed, the DRM agent of the SRM notifies the DRM agent of the terminal that decoding of the encoded CEK has failed.

If a flag indicating whether the RO has been successfully installed is set in the ROAP trigger received from the rights issuer, the DRM agent of the terminal transmits to the rights issuer both RO ID and whether the RO has been successfully installed in the SRM. If the RO has been successfully installed in the SRM, the DRM agent of the terminal transmits to the rights issuer both RO ID and whether the RO has been successfully installed in the SRM. If the RO has not been successfully installed in the SRM, the DRM agent of the terminal transmits to the rights issuer both RO ID and whether the RO has been successfully installed in the SRM. The DRM agent of the terminal may notify the user whether the RO has been successfully installed in the SRM.

As described above, in the present invention, the SRM can receive the DRM contents and/or the rights object through the terminal having a communication module.

Figure 5:
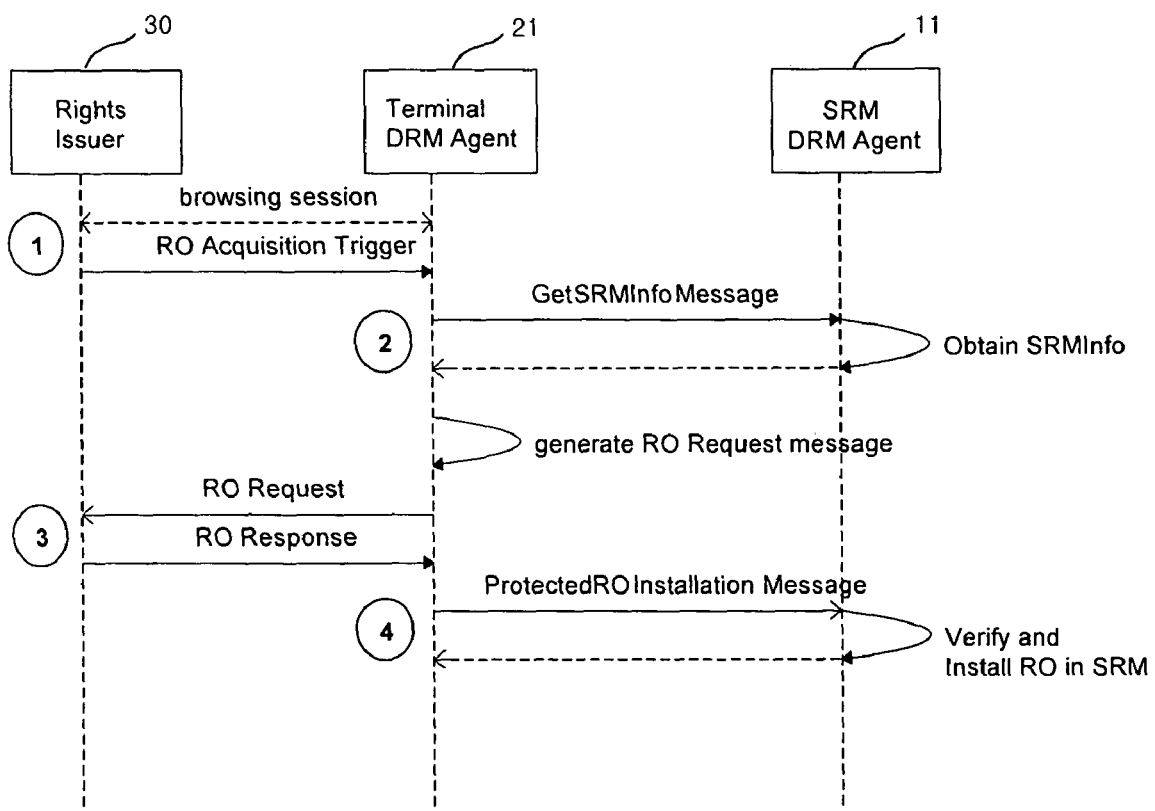
FIG. 5 illustrates a method for managing digital rights of the SRM shown in FIGS. 3 and 4.

FIG. 5 illustrates a method for managing rights object of the SRM shown in FIGS. 3 and 4.

As shown in FIG. 5, the rights object bound to the SRM is issued from the rights issuer through the host device. The procedure of receiving the rights object bound to the SRM comprises (A) transmitting the ROAP trigger from the rights issuer to the host device, (B) transmitting the RO request message from the host device to the rights issuer and receiving the RO response message to the RO request message, and (C) transmitting the rights object included in the RO response message from the DRM agent of the host device to the DRM agent of the SRM and installing the rights object.

The host device (for example, terminal) receives the ROAP trigger from the rights issuer. The ROAP trigger includes at least SRM ID.

The host device transmits to the rights issuer the RO request message for requesting the rights object bound to the SRM. The RO request message comprises at least SRM ID, the certificate chain of the SRM, and SRM information, wherein the SRM ID is equal to that included in the ROAP trigger. The SRM information includes the digital signature value of the SRM. The public key of the SRM is transmitted to the rights issuer through the certificate chain of the SRM, and the rights issuer verifies the signature value of the SRM by using the public key of the SRM. If the SRM is not connected with the host device, the host device immediately aborts the procedure for receiving the RO bound to the SRM (that is, aborts ROAP transaction).

The host device receives the RO response message to the RO request message from the rights issuer. The RO response message includes at least the SRM ID, the digital signature value and protected RO.

The host device notifies the SRM to install the RO included in the RO response message, and the SRM installs the RO by verifying the RO included in the RO response message. The SRM decodes the MAC key by using its private key or domain key and verifies the MAC value of the RO included in the RO response message by using the decoded MAC key. If the MAC value of the RO is valid, the SRM installs the RO. Also, the SRM verifies the MAC value of the RO included in the RO response message and the digital signature value of the RO response message, and if both the MAC value and the digital signature value are valid, the SRM may install the RO.

As described above, the method and apparatus for managing digital rights of a memory card have the following advantages.

The terminal having the SRM generates the RO request message for requesting the rights object bound to the SRM by interworking with the DRM agent of the SRM and transmits the RO request message to the rights issuer so that the rights object bound to the SRM issued by the rights issuer can be installed in the SRM.

Since the terminal connected with the SRM generates the RO request message for requesting the rights object bound to the SRM, by interworking with the SRM, the rights issuer can issue the rights object bound to the SRM.

When the specific DRM contents are stored in at least one of the SRM and the terminal having the SRM, the rights object of the specific DRM contents can be issued to the SRM through the terminal and then can be installed in the SRM.

The DRM contents and the rights object bound to the SRM can be issued from the rights issuer by combined delivery or separately delivery.

Finally, the SRM can store the DRM contents and/or install the rights object bound to the SRM.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for managing rights object of Secure Removable Media (SRM) which corresponds to one type of memory card and includes a processor and a memory having a SRM agent, the method performed by a terminal having a processor having a digital rights management (DRM) agent configured to communicate with the SRM agent and the method comprising:

exchanging, by the terminal, information with the SRM, wherein the information includes a terminal ID for identifying the terminal and a SRM ID for identifying the SRM;

performing, by the terminal, a mutual authentication procedure with the SRM;

receiving, by the terminal, a trigger message from a right issuing server which indicates to the terminal that a rights object bound to the SRM is prepared in the right issuing server;

if a parameter included in the trigger message does not indicate the SRM, performing, by the terminal, a procedure for obtaining a rights object for the terminal;

if a parameter included in the trigger message indicates the SRM which is inserted into the terminal, performing, by the terminal, a procedure for requesting a rights object for the SRM;

wherein the procedure for requesting the rights object for the SRM includes: generating, by the terminal and on behalf of the SRM, a rights object request message for requesting a rights object for the SRM from the rights issuing server, the rights object request message including not a terminal ID for identifying the terminal, but the SRM ID for identifying the SRM;

transmitting, from the terminal to the SRM, a signature request including the generated rights object request message for requesting a rights object for the SRM in order to confirm that the SRM itself requests the rights object for the SRM itself;

receiving, by the terminal and from the SRM, a signature response including a signature of the SRM, wherein the signature is generated by the SRM agent of the SRM in order to confirm that the SRM itself requests the rights object for the SRM itself;

transmitting, from the terminal to the rights issuing server, the generated rights object request message for requesting a rights object for the SRM, wherein the signature generated by the SRM agent of the SRM is inserted into the generated rights object request message in order to confirm that the SRM itself requests the rights object for the SRM itself;

receiving, by the terminal, and from the rights issuing server, a rights object response message, the rights object response message including not the terminal ID but the SRM ID and a protected rights object, wherein the rights object is cryptographically bound to the SRM such that the terminal without a key of the SRM is prohibited from decrypting the rights object cryptographically bound to the SRM; and transmitting, from the terminal to the SRM, the information about the protected rights object to be installed in the SRM.

2. The method of claim 1, wherein
the protected rights object includes a rights encryption key (KREK) and a message authentication code (MAC) algorithm key (KMAC), and
at least one of the SRM ID, the KREK and the KMAC of the protected rights object in the rights object response message is encrypted by a public key of the SRM.

3. The method of claim 1, wherein the trigger message is a Rights Object Acquisition Protocol (ROAP) trigger message.

4. The method of claim 1, further comprising:
determining, by the terminal, whether or not the SRM device parameter in the trigger message is checked.

5. The method of claim 1, wherein the rights object response message includes a second signature, the method further comprising:
verifying, by the terminal, the second signature.

6. The method of claim 1, wherein the converting step includes formatting the information about the protected rights object such that the information about the protected rights object is able to be installed in the SRM.

7. The method of claim 1, wherein the SRM device parameter is an SRM ID.

8. The method of claim 1, further comprising:
if the SRM is detached from the terminal, aborting the procedure for requesting the rights object for the SRM.

9. The method of claim 1, wherein during the mutual authentication procedure, a SRM's Certificate Chain is received.

10. The method of claim 2, further comprising:
transmitting, by the terminal, the encrypted KREK and KMAC included in the rights object to the SRM;
receiving, by the terminal and from the SRM, a decrypted KMAC key; and
verifying, by the terminal, a MAC value in the protected rights object using the decrypted KMAC.

11. A terminal for managing rights object of Secure Removable Media (SRM) which corresponds to one type of a memory card and has a processor and a memory thereby to operate a SRM agent, the terminal comprising:
a processor having a digital rights management (DRM) agent configured to manage a rights object and to:
exchange information with the SRM, wherein the information includes a terminal ID for identifying the terminal and a SRM ID for identifying the SRM;
perform, a mutual authentication procedure with the SRM;
receive, by the terminal, a trigger message from a right issuing server which indicates to the terminal that a rights object bound to the SRM is prepared in the right issuing server;
if a parameter included in the trigger message does not indicate the SRM, perform a procedure for obtaining a rights object for the terminal;
if a parameter included in the trigger message indicates the SRM which is inserted into the terminal, perform a procedure for requesting a rights object for the SRM;
wherein the procedure for requesting the rights object for the SRM includes:
generating on behalf of the SRM a rights object request message for requesting a rights object for the SRM from the rights issuing server, and the rights object request message including not the terminal ID for identifying the terminal, but the SRM ID for identifying the SRM;
transmitting a signature request including the generated rights object request message for requesting a rights object for the SRM in order to confirm that the SRM itself requests the rights object for the SRM itself;
receiving, from the SRM, a signature response including a signature of the SRM, wherein the signature is generated by the SRM agent of the SRM in order to confirm that the SRM itself requests the rights object for the SRM itself;
transmitting to the rights issuing server, the generated rights object request message for requesting a rights object for the SRM, wherein the signature generated by the SRM agent of the SRM is inserted into the generated rights object request message;
receiving, from the rights issuing server, a rights object response message, the rights object response message including not the terminal ID but the SRM ID and a protected rights object, wherein the rights object is cryptographically bound to the SRM such that the terminal without a key of the SRM is prohibited from decrypting the rights object cryptographically bound to the SRM; and
transmitting, to the SRM, the information about the protected rights object to be installed in the SRM.

12. The terminal of claim 11, wherein
the protected rights object includes a rights encryption key (KREK) and a message authentication code (MAC) algorithm key (KMAC), and
at least one of the SRM ID, the KREK and the KMAC in the rights object is encrypted by a public key of the SRM.

13. The terminal of claim 11, wherein the trigger message is a Rights Object Acquisition Protocol (ROAP) trigger message.

14. The terminal of claim 11, wherein the processor is configured to determine whether or not the SRM device parameter in the trigger message indicates the SRM.

15. The terminal of claim 11,
wherein the rights object response message includes a signature, and
wherein the processor is further configured to verify the signature.

16. The terminal of claim 11, wherein the processor is configured to format the information about the protected rights object such that the information about the protected rights object is able to be installed in the SRM.

17. The terminal of claim 11, wherein if the SRM is detached from the terminal, the terminal aborts the procedure for requesting the rights object for the SRM.

* * * * *